Oct. 29, 1963     D. S. DEGEN     3,109,155
PROTECTIVE CASING FOR AN ULTRASONIC TRANSDUCER
Filed May 1, 1961     3 Sheets-Sheet 1

INVENTOR.
D. S. DEGEN
BY
HIS ATTORNEY

Oct. 29, 1963  D. S. DEGEN  3,109,155
PROTECTIVE CASING FOR AN ULTRASONIC TRANSDUCER
Filed May 1, 1961  3 Sheets-Sheet 2

INVENTOR.
D. S. DEGEN
BY
Robert S. Hitchcock
HIS ATTORNEY

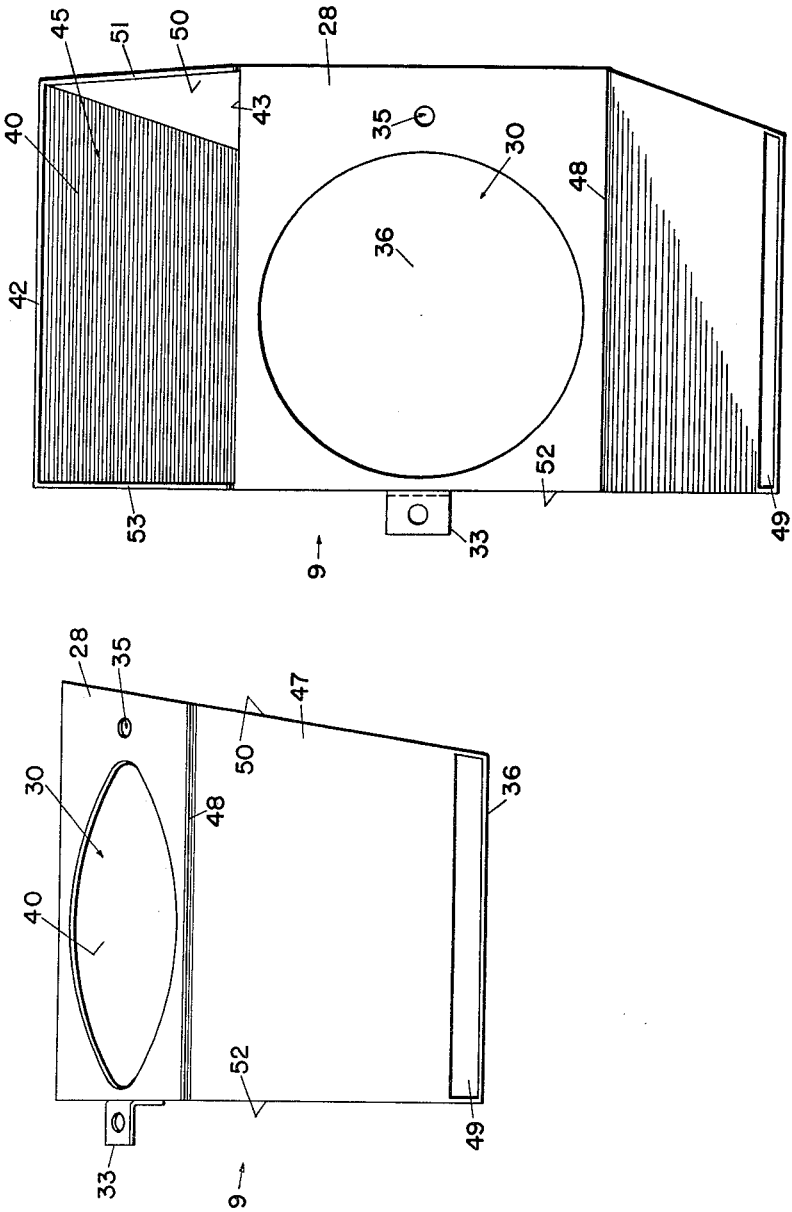

United States Patent Office 3,109,155
Patented Oct. 29, 1963

---

3,109,155
PROTECTIVE CASING FOR AN ULTRASONIC TRANSDUCER
Donald S. Degen, Rochester, N.Y., assignor to General Signal Corporation, a corporation of New York
Filed May 1, 1961, Ser. No. 106,651
5 Claims. (Cl. 340—15)

The present invention relates to a protective deflector casing for electro-ultrasonic transducers, and particularly to the type which uses a single transducer for transmitting and receiving ultrasonic waves to detect the passage of vehicles.

In ultrasonic systems used out of doors for detecting vehicles traveling along a highway, or railway cars traveling on a section of track, for example, it is often desirable to employ a system of the type wherein the ultrasonic waves are normally being transmitted, and the reflection of these transmitted waves when they strike a passing vehicle is detected by a transducer to indicate a vehicle's presence.

In such systems, it is necessary that the ultrasonic transducer head not only be protected adequately from the weather, but also mounted so that the ultrasonic waves will not be reflected to the transducer by the earth or other obstructions when no vehicle is present. Thus, the transmitted waves should travel upwardly in a substantially vertical path, or depending upon the actual conditions of operation any path which lies in a plane that extends from the horizontal to the vertical. In order to provide such a system, the ultrasonic detector must be mounted to face downwardly to protect it from the weather, and have a protective casing to deflect the ultrasonic waves at the appropriate angle through the desired path.

Heretofore, in ultrasonic systems of the type that employ protective deflector casings, the ultrasonic waves, particularly in the case of the transmitting transducer, were reflected from the interior walls of the casing which created multiple vibrations and undesirable echos. Thus, in these systems it was necessary either to employ separate transducers, one for transmitting, and the other for receiving, so that these undesirable reflected waves and vibrations would not adversely affect the system, or in the alternative to provide the walls of the casing with acoustical material, which is prone to the collection of water, dirt or other foreign material, thereby causing it to lose its acoustical properties.

The purpose of the present invention is to provide a protective deflector casing for an ultrasonic transducer, which permits the same transducer to be used for both the transmission and reception of ultrasonic waves; and which does not employ special acoustical materials to prevent the undesirable reflection within the casing. In furtherance thereof, one of the objects of the present invention is to provide a metallic protective deflector casing for an ultrasonic transducer which will not create undesirable reflections and echos to adversely affect the system.

Another object of this invention is to provide a protective deflector casing for an ultrasonic transducer wherein the transducer head may be mounted to face downwardly and the transmitted and reflected waves are deflected in paths that may extend from the horizontal to the vertical.

Another object of the invention is to provide a protective deflector casing which does not create any undesirable reflections of ultrasonic waves and provides an enclosure which provides maximum protection from the elements.

A further object of this invention is to provide a protective deflector casing for an ultrasonic transducer wherein the interior walls of the casing so constructed have a plane surface to permit the adequate draining of any moisture or water entering the casing.

A further object of this invention is to provide a metallic protective deflector casing for an ultrasonic transducer which does not require the addition of any special acoustical materials to prevent undesirable reflections and echos in the casing, which would adversely affect the system.

A further object of this invention is to provide a protective deflector casing for an ultrasonic transducer, which is adapted to be separately attached or integral with a transducer head assembly that may be mounted adjacent railroad track rails for detecting cars intersecting the path of the transmitted waves.

A still further object of this invention is to provide a protective deflector casing of the character described which is durable and compact in its construction, relatively inexpensive to manufacture, and has means for preventing the accumulation of ice and snow in freezing temperatures inside the casing.

Other objects of this invention will become apparent in the specification, the drawings, and the appended claims.

In the drawings,

FIG. 5 is another end elevation of the protective casing without the detector head assembly being attached thereto and without the screen being mounted to cover the wave opening; and FIG. 6 is a top plan view of the casing without the detector head being attached thereto and without the screen mounted to cover the wave opening.

More specifically, and generally speaking the present invention is comprised of a metallic casing having an upper side which is adapted to be either separately attached to a transducer head or formed to be an integral part of the transducer head assembly. This upper side is provided with an opening to receive a portion of the attached transducer head so that it is in communication with the interior of the casing. A lower side of the casing has an interior wall which serves as a deflecting surface to direct the waves that are transmitted from the attached head through a screened opening located adjacent the upper side to which the head assembly is mounted, and also serves to deflect to the head those waves which are reflected through the screened opening after striking a detected vehicle. Opposite sides of the casing of the present invention are positioned relative to each other and to the other parts of the casing to prevent multiple vibrations and echos in the interior of the casing. The opposite ends of the casing are also positioned to prevent multiple vibrations and undesirable echos therein, and also to insure that any waves reflected from the inner walls of these ends, or any other inner walls of the casing for that matter, tend to be directed through the screened opening without affecting adversely the transducer. Moreover, the walls of the casing of the present invention have plane surfaces and are so positioned that any accumulation of water, and other foreign material will tend to flow unrestricted from the interior thereof regardless of whether the transducer is mounted so that the screened opening opens upwardly, or is mounted on its side so that it opens in a substantially horizontal plane.

Figure 1:
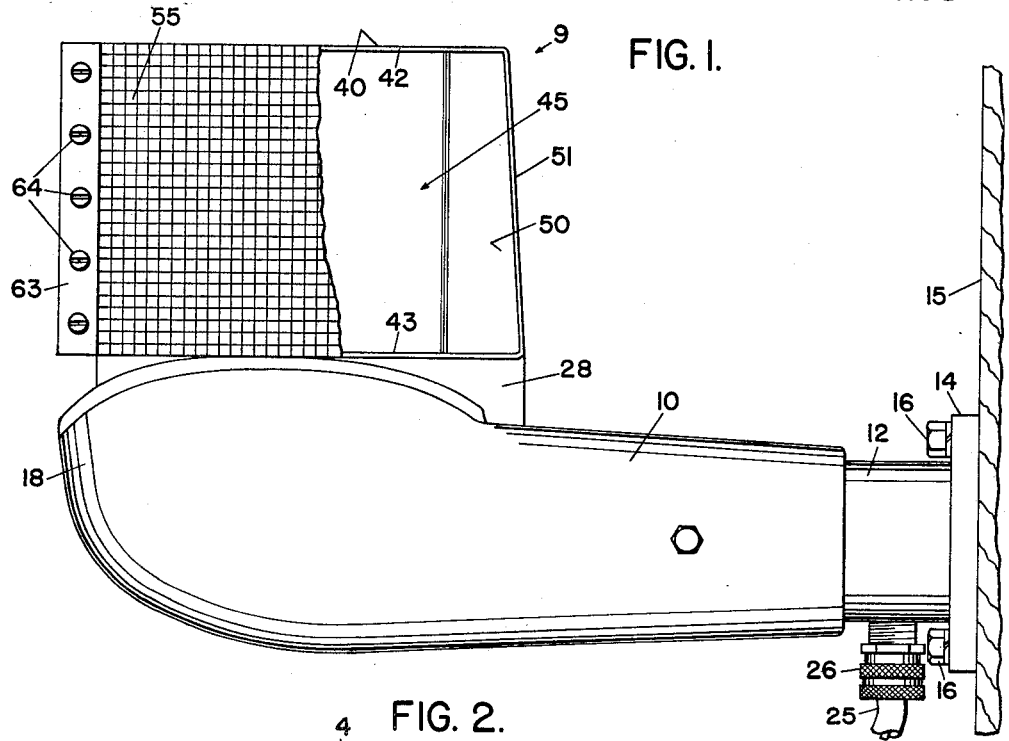
FIG. 1 is a top plane view of a protective casing constructed according to one embodiment of this invention and showing it separately attached to an ultrasonic transducer, and having parts cut away to show the interior thereof.
Figure 2:
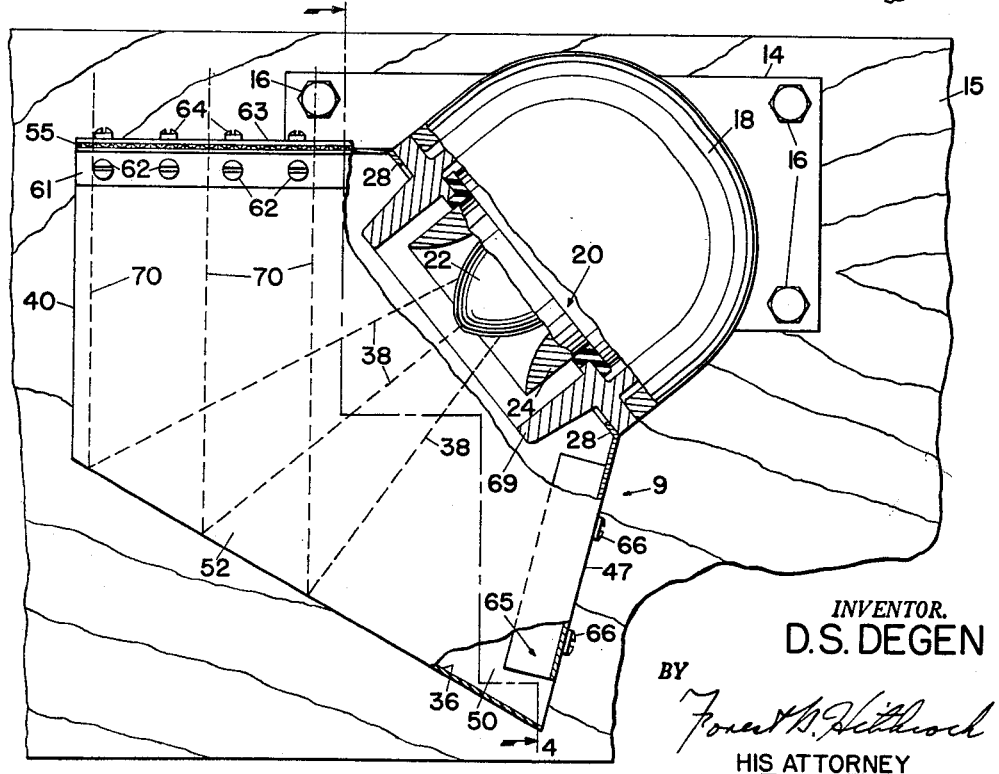
FIG. 2 is an end elevation of the casing with a transducer head attached thereto with portions cut away to show the interior of the casing.
Figure 3:
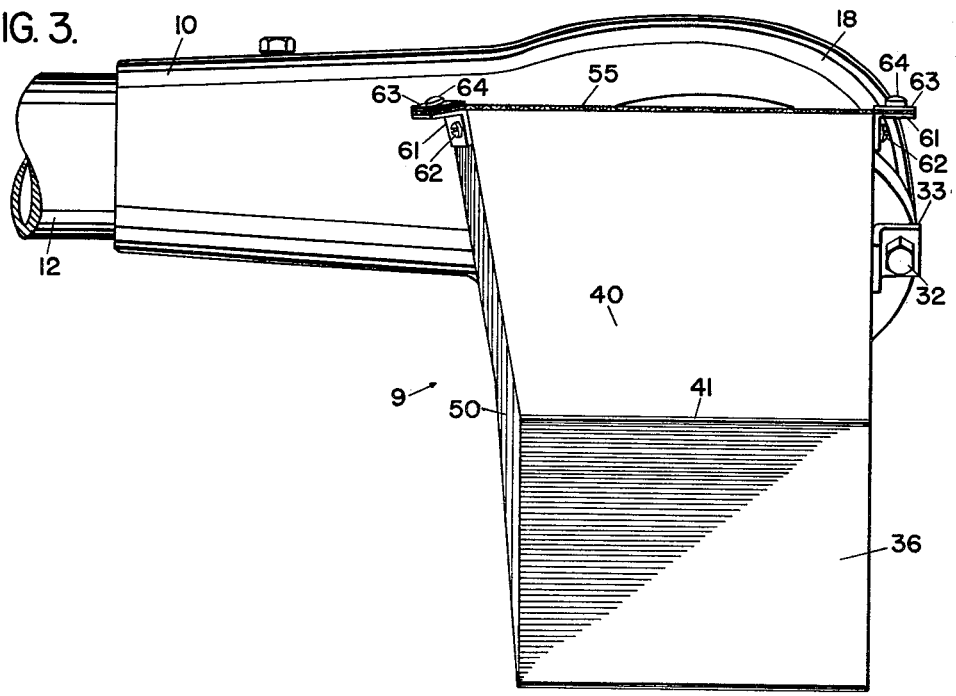
FIG. 3 is a side view of the casing and transducer head assembly.
Figure 4:
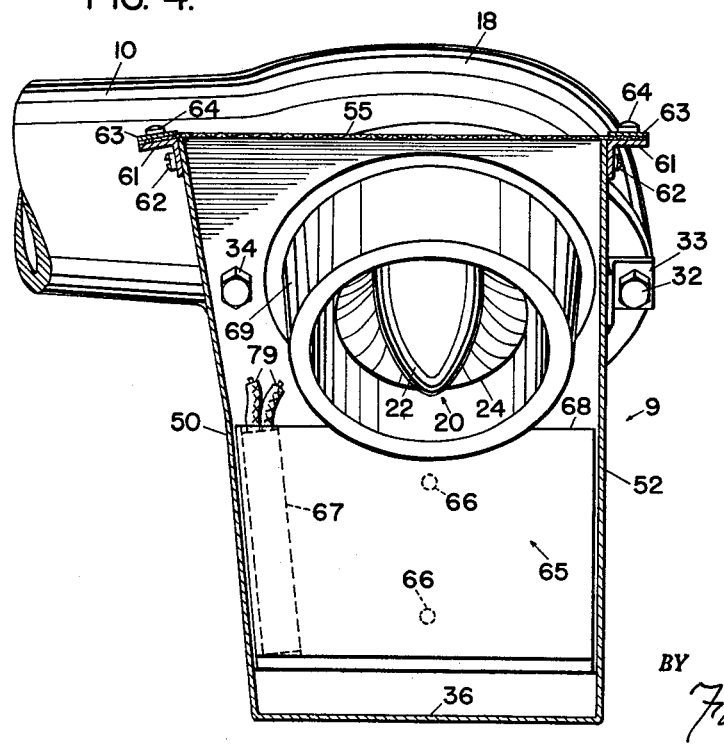
FIG. 4 is a sectional view of the casing and attached transducer assembly taken on line 4—4 of FIG. 2.

Referring to the drawings, a protective casing constructed according to one embodiment of this invention is generally referred to at 9, and is illustrated in FIGS. 1 through 4 as being removably attached to an ultrasonic head assembly 10, which may be used in a system for both transmitting and receiving ultrasonic waves. In the illustrated embodiment of the invention, the casing 9 is a seven sided sheetmetal housing, one side of which is a screened opening through which the waves pass and an adjacent side of which is provided for mounting the assembly 10.

The assembly 10 has an extension 12 to which a base plate 14 is securely attached at one end as by welding, for example. The base plate 14 is adapted to be secured to a rigid member 15, such as a railroad tie, for example, for mounting the transducer head in operative position. Lug screws 16 or other suitable means serve to secure the base plate 14 to the member 15. The detector assembly 10 may be so positioned that its generally half egg-shaped portion 18 in which is mounted a transducer 20 faces in a generally downward direction.

The transducer 20, which may be of any standard configuration, has a ring portion 24 defining an orifice and a centrally located inner member 22 spaced from the ring portion 24. The ultrasonic waves are transmitted in a generally diverging pattern from the space between the inner member 22 and the ring portion 24. Similarly, the transducer 20 when a vehicle is detected receives the waves in the space surrounding the inner member 22. A cable 25 is secured by a connection 26 adjacent the base plate 14. One end of the cable 25 extends into the hollow portion of the assembly 10 and is operatively connected to the transducer 20. The other end of the cable 25 is assumed to be operatively connected to the electronic components of the system.

The casing 9, which is made of relatively heavy gauge sheetmetal to prevent flexing and warping, and to provide durability, as well as a deflector surface, is comprised of a top wall 28 which has an opening 30 that is adapted to receive the transducer 20 when the casing 9 is mounted on the portion 18 of the assembly 10. The casing 9 may be removably attached to the transducer assembly 10 by a bolt 32 which extends through an opening in a bracket 33 attached to the casing and a bolt 34 which extends through an opening 35 in the top wall 28 of the casing 9. When the assembly 10 is fastened to the casing 9 or integrally formed therewith, the ring portion 24 extends slightly into the casing 9 substantially normal to the plane of the top wall 28.

The casing 9 is formed to have a bottom wall 36, a portion of the inner face of which serves as the deflecting surface for the ultrasonic waves, and which is so positioned that its deflecting face forms an angle of approximately 20° with the inner face of the top wall 28. The transmitted ultrasonic waves, which diverge in a generally conical-shaped pattern from the transducer 20, may vary through an angle from between substantially 10° to 20° at −3 db points and at a power level measured at approximately twenty kilocycles depending on the type of transducer employed. It has been found that in operating the transducer at approximately twenty kilocycles, the side lobes of the transmitted pattern do not adversely affect the operation. The distance of the bottom wall 36 from the top wall 28 is such, and the area of the bottom wall 36 is such that the transmitted waves strike the deflecting face of the bottom wall 36 substantially within the confines of the edges of the bottom wall 36, depending on the angle of divergence of the waves of the transducer 20. A representative wave form is indicated by the dashed lines 38 (FIG. 2), which extend from around the inner member 22 to the deflecting face of the bottom wall 36.

The casing 9 is formed to have a forward end wall or side 40 which is bent upwardly at 41 approximately 60° from the plane of the bottom wall 36 to form approximately an angle of 120° with the deflecting face of the bottom wall 36. The distance between upper edge 42 of the forward end wall 40 and edge 43 of the top wall 28 determines the length of the opening 45 through which the waves pass.

A rear end wall 47 depends at 48 downwardly from the plane of the top wall 28 at an angle of approximately 55°, thereby forming an angle of approximately 125° with the top wall 28. The bottom wall 36 extends rearwardly to form an angle of between 70 and 80° with the rear end wall 47. The end wall 47 is short of the bottom wall 36 to form a slot 49 which extends the width of the end wall 47 at the lower edge of the end wall 47 for draining any water that falls onto the deflecting face of bottom wall 36.

The casing 9 is closed at opposite edges of the bottom wall 36 and the front wall 40 and the rear wall 47 by similarly configurated plane polygonal side walls 50 and 52. The side wall 52 closes one side of the casing 9 by depending substantially normal to the plane of the top wall 28 and the bottom wall 36. The side wall 50 closes the opposite side of the casing, and is not parallel with the side wall 52 and depends outwardly slightly beyond the normal from the plane of the bottom wall 36, that is, the plane of the side wall 50 forms an angle of approximately 100° with the deflecting face of the bottom side 36. This side wall 50 also forms approximately an 80° angle with the plane of the top wall 28. The side wall 50 has an upper edge 51 which defines one edge of the opening 45, and the side wall 52 has an upper edge 53 which defines the opposite side of the opening 45.

Thus, the boundaries of the opening 45 are formed by edge 43 of the top wall 28, edge 42 of the wall 40, and edges 51 and 53 of the sides 50 and 52. The opening 45 is covered by a screen 55 to prevent large objects, which would injure the head 20, and could not go through the slot 49, from entering the casing 9. To mount the screen 55 on the casing 9 a pair of brackets 61 are fastened adjacent the upper edges of the side walls 50 and 52 by a plurality of screws 62. The screen 55 is clamped at opposite sides between members 63 and the brackets 62 by a plurality of screws 64.

To prevent the accumulation of ice and snow in the casing 9, a heating assembly generally referred to at 65 may be fastened to the inner face of the rear end wall 47 by screws 66. This heating assembly 65 is comprised of an electric heating element 67 (FIG. 4) which is cylindrical in configuration and is mounted in a cylindrical opening of a metallic block 68 of the assembly 65. The energizing of wires, such as 79 heats the coil in the element 67, which heat is conducted to the block 68. The block 68 radiantly warms the interior of the casing 9 and clears the screen 55 of any accumulation of ice or snow. It also heats the walls of the casing 9 by conduction. Also, the heating assembly 65 causes the rear wall 47 to radiate heat exteriorly of the casing 9, thereby melting any accumulation of ice or snow which would tend to obstruct the slot 49 to prevent the water to flow out of the casing 9. The block 68 is generally cubical in configuration having opposing sides which are substantially parallel so that the exposed face of the block 68 lies in the same plane as the end wall 47 to prevent undesirable reflections.

The waves emanating from the transducer 20, which are indicated by the dashed lines 38 strike the deflecting face of the bottom wall 36 and are deflected along the axis of a conduit portion of the casing formed by intersecting walls 40, 50 and 52 through the screened opening 45. The waves passing through the opening 45 are indicated by the dashed lines 70.

The fact that the top wall 28 is spaced from the bottom wall 36 and the plane of the top wall 28 lies at an angle of approximately twenty degrees, the angle of incidence of the waves indicated at 38 are approximately 20°. Because the angle of incidence equals the angle of reflection, the waves 70 deflect out the opening 45 at an angle of substantially 20° to the perpendicular of the deflecting wall 36. With substantially these angles of incidence and reflection and the attitude of the transducer 20, the casing 9 may be formed so that the opening 45 is closely adjacent the portion 18 of the transducer assembly 10 to provide a compact enclosure. The area of the opening 45 is required to substantially equal at least the area of the deflecting wall 36 which is impinged by the waves 38. With ring portion 69 of the portion 18 of the transducer assembly 10 extending slightly into the casing 9 it is apparent that the opening 30 can extend to the edge 43 (FIG. 1) of the top wall 28 with the face of the transducer 20 being further shielded from the weather by the ring 69. The forward end wall 40 is formed at the aforesaid angle with the deflecting wall 36 so that it is substantially parallel with the deflected waves 70, thus permitting the opening 45 to be of minimum length.

The effects of any peripheral waves in the substantially conical pattern which may deflect from the wall 36 so as to strike the interior of the casing 9 does not adversely affect the transducer because of the construction of the casing 9 with respect to the end wall 47 and the side walls 50 and 52.

The end wall 47 being formed at an acute angle with the bottom wall 36 and an obtuse angle with the plane of the top wall 28, prevents the reflection of any waves impinging on this end wall 47 from reaching the transducer head 20. The acute angle of the end wall 47 with the bottom wall 36 prevents the creation of an angle of incidence whereby the resulting angle of reflection would direct the wave to the transducer to adversely affect the system. The acute angle that is formed by the rear wall 47 and the bottom wall 36, which has been most effective, is in the neighborhood of 75°, although as previously mentioned an angle of between 70° and 80° produces good results.

The side walls 50 and 52, being formed in planes that are not parallel, prevents multiple vibrations or a so-called V effect of the waves between these sides. Also if the transducer 20 is mounted so that the opening 45 directs the wave in a horizontal path, the side wall 50 is the bottom-most wall of the casing 9 which is tilted at a slight angle to the horizontal so that water will not collect in the casing 9. It is apparent that when the waves are directed upwardly in a vertical path the bottom wall 36 is at an angle to the horizontal so that the water will run out of the slot 49.

Thus, I have provided a compact metallic casing for an ultrasonic transducer, which permits a single transducer to be used as both a transmitter and receiver without any special acoustical liners in the casing. Also, I provided such a casing which is compact, and offers maximum weather protection to the transducer head, and which permits the transducer head to face downwardly while deflecting the waves in an upwardly vertical path. Moreover, I have provided a casing having a heating assembly which is so constructed and mounted that will not adversely affect the system by reflecting waves in the casing.

Having thus described one embodiment of a protective deflector casing for an ultrasonic transducer, it is to be understood that various other forms, adaptations, alterations and modifications may be incorporated to meet the requirements of practice except as limited by the scope of the appended claims.

What I claim is:

1. In combination, a transducer for transmitting and receiving ultrasonic waves, means for mounting said transducer to transmit said waves downwardly at an angle to the horizontal, a hollow metallic casing mounted on said transducer, said casing having an opening therein through which said waves may pass substantially vertically and a deflecting wall positioned to be at an angle to said transducer to deflect said waves through said opening without echoing from the interior of said casing, and a pair of spaced side walls positioned in unparallel planes and having edges to define opposite sides of said opening, whereby transmitted and reflected waves will not reverberate within said casing to adversely affect said transducer.

2. A hollow metallic casing for protecting a transducer head that is mounted to face downwardly to deflect ultrasonic waves upwardly in a substantially vertical path comprising, a top wall to which said transducer is attached, a deflecting wall spaced from said top wall and position at an angle thereto to deflect the waves upwardly beyond one edge of the top wall, a front wall formed substantially parallel to the deflected waves and spaced from said one edge of the top wall, a pair of side walls joined to said top wall and front wall and opposite edges of said deflector wall and lying in unparallel planes, and a rear wall joined to said side walls and deflector wall and top wall at an acute angle to said deflector wall, whereby ultrasonic waves will not reverberate in said casing to affect adversely the said transducer.

3. In combination, an electro-acoustic transducer having an orifice for sound energy, a generally hollow casing for supporting said transducer and for directing sound energy travelling between said orifice and free space, said casing defining an aperture for receiving said orifice and mounting said transducer with its principal axis directed inwardly into the interior of said casing, said casing also defining a conduit portion communicating between the interior of said casing and free space and having its axis forming an acute angle with said axis of said transducer, a single planar sound reflecting surface forming an inner surface of said casing, said reflecting surface being positioned to have impinge thereupon sound waves emanating from said transducer orifice and also substantially all sound waves travelling inwardly through said conduit and into the interior of said casing, said reflecting surface lying in a plane which is substantially normal to the bisector of said acute angle.

4. The combination of claim 3 in which said conduit portion of said casing is planar sided with all planar surfaces being mutually non-parallel.

5. The combination of claim 3 in which the interior of said casing is formed substantially of planar surfaces which are all mutually non-parallel.

References Cited in the file of this patent

UNITED STATES PATENTS 2,815,087    Delort _____ Dec. 3, 1957

FOREIGN PATENTS 698,076    Great Britain _____ Oct. 7, 1953